US010055652B2

(12) United States Patent
Myers et al.

(10) Patent No.: US 10,055,652 B2
(45) Date of Patent: Aug. 21, 2018

(54) PEDESTRIAN DETECTION AND MOTION PREDICTION WITH REAR-FACING CAMERA

(71) Applicant: Ford Global Technologies, LLC, Dearborn, MI (US)

(72) Inventors: Scott Vincent Myers, Camarillo, CA (US); Venkatapathi Raju Nallapa, Fairfield, CA (US); Vidya Nariyambut Murali, Sunnyvale, CA (US); Madeline Jane Goh, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 151 days.

(21) Appl. No.: 15/076,407

(22) Filed: Mar. 21, 2016

(65) Prior Publication Data

US 2017/0270374 A1    Sep. 21, 2017

(51) Int. Cl.
*G06K 9/00* (2006.01)
*B60Q 9/00* (2006.01)
*B60R 1/00* (2006.01)

(52) U.S. Cl.
CPC ............ *G06K 9/00805* (2013.01); *B60Q 9/00* (2013.01); *B60R 1/00* (2013.01)

(58) Field of Classification Search
CPC ................................................. G06K 9/00805
USPC ........................................................ 348/148
See application file for complete search history.

(56) References Cited

U.S. PATENT DOCUMENTS

| 8,872,919 | B2 * | 10/2014 | Watanabe | ................. | B60R 1/00 348/148 |
| 9,177,196 | B2 * | 11/2015 | Kiyohara | ........... | G06K 9/00369 |
| 9,317,776 | B1 * | 4/2016 | Honda | ................. | G06K 9/6202 |
| 9,569,696 | B1 * | 2/2017 | Osindero | ................. | G06K 9/66 |
| 9,613,276 | B2 * | 4/2017 | Burghouts | ......... | G06K 9/00711 |
| 2001/0035907 | A1 * | 11/2001 | Broemmelsiek | ...... | G01S 3/7864 348/169 |
| 2007/0165910 | A1 * | 7/2007 | Nagaoka | ............... | B60W 40/04 382/104 |
| 2011/0133915 | A1 * | 6/2011 | Ito | .......................... | B60Q 1/525 340/435 |

(Continued)

FOREIGN PATENT DOCUMENTS

| JP | 2005309660 A |   | 11/2005 |
| JP | 2006031443 A | * | 2/2006 |
| JP | 2007069806 A |   | 3/2007 |

OTHER PUBLICATIONS

Proceedings of the FISITA 2012 World Automotive Congress, vol. 197 of the series Lecture Notes in Electrical Engineering pp. 519-528, Nov. 2, 2012.

*Primary Examiner* — Dave Czekaj
*Assistant Examiner* — Shanika Brumfield
(74) *Attorney, Agent, or Firm* — David R. Stevens; Stevens Law Group

(57) ABSTRACT

Systems, methods, and devices for pedestrian detection are disclosed herein. A method includes receiving one or more images from a rear-facing camera on a vehicle. The method further includes determining that a pedestrian is present in the one or more images, predicting future motion of the pedestrian, and notifying a driver-assistance or automated driving system when a conflict exists between forward motion of the vehicle and the predicted future motion of the pedestrian.

20 Claims, 6 Drawing Sheets

(56) References Cited

U.S. PATENT DOCUMENTS

| | | | |
|---|---|---|---|
| 2012/0120237 A1* | 5/2012 | Trepess | H04N 5/144 348/143 |
| 2012/0327236 A1* | 12/2012 | Kiyohara | G06K 9/00369 348/148 |
| 2013/0223686 A1* | 8/2013 | Shimizu | G08G 1/166 382/103 |
| 2014/0225723 A1* | 8/2014 | Sobue | B60R 1/00 340/435 |
| 2015/0015712 A1* | 1/2015 | Sempuku | G08G 1/165 348/148 |
| 2015/0224956 A1* | 8/2015 | Takenaka | B60R 21/36 73/862.381 |
| 2015/0269844 A1* | 9/2015 | Arndt | G08G 1/167 340/435 |
| 2017/0154245 A1* | 6/2017 | Osindero | G06K 9/6256 |

* cited by examiner

PEDESTRIAN DETECTION AND MOTION PREDICTION WITH REAR-FACING CAMERA

TECHNICAL FIELD

The disclosure relates generally to methods, systems, and apparatus for automated driving or for assisting a driver, and more particularly relates to methods, systems, and apparatus for detecting one or more pedestrians using machine learning and rear-facing cameras.

BACKGROUND

Automobiles provide a significant portion of transportation for commercial, government, and private entities. Autonomous vehicles and driver assistance systems are currently being developed and deployed to reduce an amount of user input required or even eliminate user involvement entirely. However, due to the dangers involved in driving and the costs of vehicles, it is important that autonomous vehicles and driver assistance systems operate safely. Accordingly, what is needed are systems and methods that improve the safety of autonomous vehicles and driver-assistance systems.

BRIEF DESCRIPTION OF DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
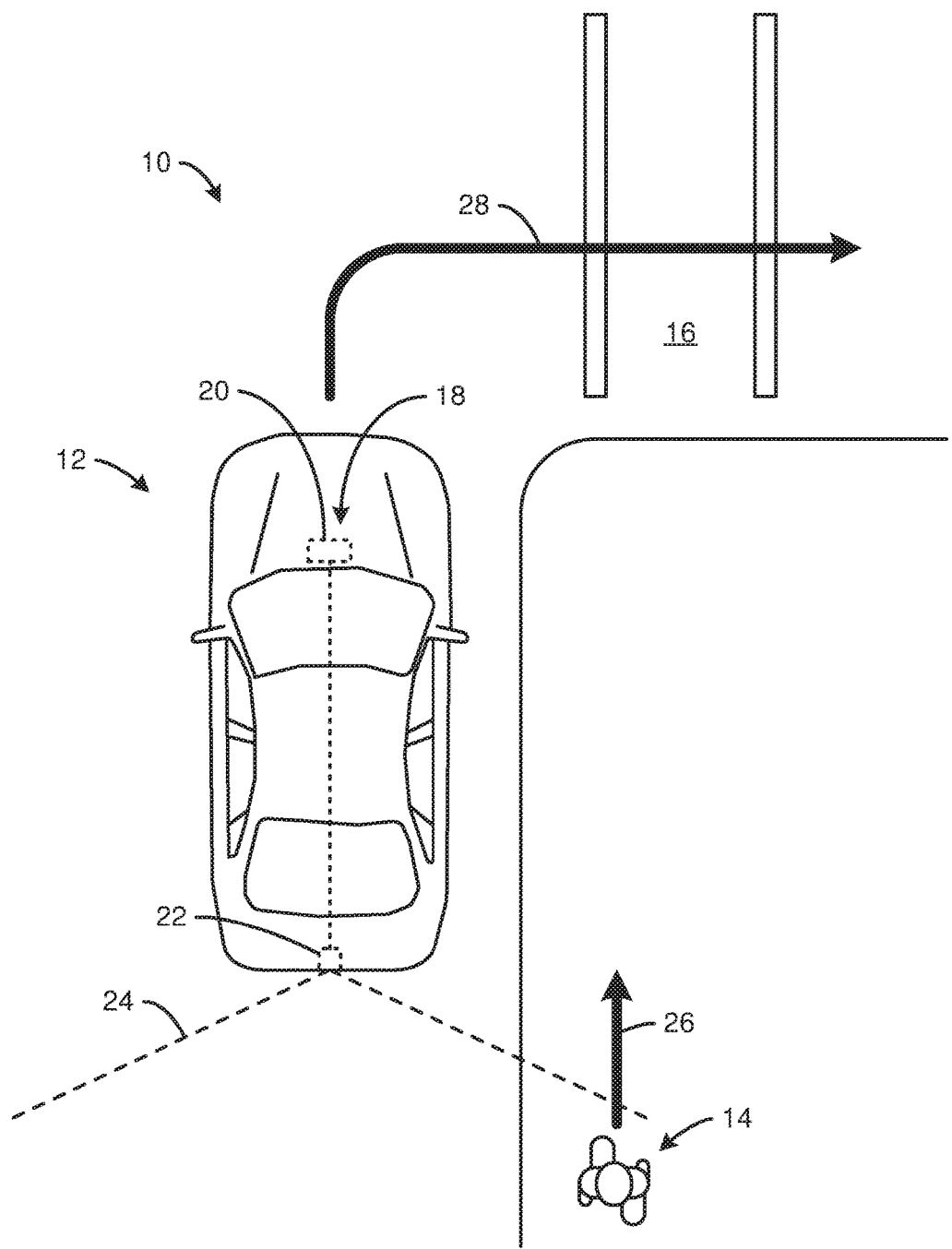
FIG. 1 is a schematic illustration of a top view of a portion of an intersection occupied by a vehicle and a pedestrian.

Referring to FIG. 1, one challenge in the area of visual perception for autonomous driving and/or active safety may be detecting and predicting pedestrians sufficiently early to avoid collisions. This challenge may be particularly relevant to the environment surrounding crossings and intersections 10. Pedestrians often disobey traffic control signals and/or misjudge the situation while attempting to cross a street. Such actions may leave very little time for decision-making processes and the implementation of evasive action.

For example, while a vehicle 12 is waiting (e.g., waiting to turn right) at an intersection 10, a pedestrian 14 may enter a crosswalk 16 from behind the vehicle 12 or from a blind spot of the driver of the vehicle 12. Thus, the vehicle 12 may collide with the pedestrian 14 before the driver (or a forward-looking sensor on the vehicle 12) perceives the pedestrian 14 or before appropriate evasive action (e.g., braking) can be taken or fully implemented.

Accordingly, a safety system 18 in accordance with the present invention may be incorporated within one or more vehicles 12. A safety system 18 may prevent or reduce the number of such accidents. In selected embodiments, a safety system 18 may include a pedestrian component 20 and at least one rear-facing camera 22.

A rear-facing camera 22 may be mounted to a vehicle 12 so as to capture images of an area behind the vehicle 12. In certain embodiments, a rear-facing camera 22 may be a backup camera or the like having a wide viewing angle 24. For example, a rear-facing camera 22 may be a standard backup camera that employs a "fish eye" lens to provide a wide field of view (e.g., a field of view of about 150 degrees). In such embodiments, the backup camera may be "on" and useful for pedestrian-detection purposes whenever the vehicle 12 is running. However, for safety reasons, images captured by the backup camera may be directly displayed to a driver of the vehicle 12 only when the vehicle 12 is in reverse (e.g., in a reverse gear).

A pedestrian component 20 may process one or more images captured by a rear-facing camera 22 in order to determine whether any pedestrians 14 are present in those images. Additionally, a pedestrian component 20 may use the one or more images to predict future motion 26 of one or more pedestrians 14 captured therein. Accordingly, a pedestrian component 20 may indicate (e.g., provide or initiate a warning) when a forward motion 28 of a vehicle 12 is likely to conflict or be on a collision course with a pedestrian 14 traveling in the predicted manner 26.

For example, an autonomous vehicle 12 and/or human driver of a vehicle 12 may have one or more "blind spots." A blind spot may be a location near a vehicle 12 where it may be difficult or impossible for the sensors of the vehicle 12 or a human driver of the vehicle 12 to perceive a pedestrian 14. Accordingly, a safety system 18 in accordance with the present invention may use information collected before a pedestrian 14 enters a blind spot to predict how that pedestrian 14 will behave in the blind spot.

That is, images of a pedestrian 14 collected while he or she is in the field of view of a rear-facing camera 22 (e.g., as he or she approaches and/or passes a rear portion of a vehicle 12) may be used to predict how he or she will behave in the near future (e.g., while located to the side of the vehicle 12 in a blind spot of the driver and/or sensors of the vehicle 12). This may enable a vehicle 12 to warn a driver or take evasive action whenever forward motion 28 of a vehicle 12 is likely to conflict with a pedestrian 14 traveling in the predicted manner 26. Accordingly, a pedestrian component 20 in accordance with the present invention need not have current, actual knowledge of the location of a pedestrian 14 at all times in order to take one or more actions to avoid a collision with that pedestrian 14.

In selected embodiments, a method implemented by a pedestrian component 20 to detect pedestrians 14 may include receiving an image from a rear-facing camera 22 and processing the image using a first neural network to determine one or more locations or regions where pedestrians 14 are likely located within the image. The method may further include processing the one or more locations or regions of the image using a second neural network to determine whether a pedestrian 14 is present.

Thus, a pedestrian component 20 may employ a two-stage computer vision based deep learning technique. In a first stage, one or more regions of an image obtained from a rear-facing camera 22 are identified as more likely to include pedestrians. The first stage may produce indications of such regions in the form of a saliency map. In certain embodiments, one or more saliency maps may be produced at a low-resolution (e.g., lower resolution than the images captured by a rear-facing camera 22). These low-resolution saliency maps may be used as labels for corresponding images.

In a second stage, a deep neural network classifier may determine whether a pedestrian 14 is actually present within one or more regions identified in the first stage. In selected embodiments, a second stage may use a deep neural network classifier. In certain embodiments, a convolutional neural network may be trained on cropped ground truth bounding boxes of both positive and negative pedestrian data. Specific parts of the image as identified in the first stage may be selected and identified as candidate regions. These candidate regions may be fed into the trained deep neural network, which classifies the potential pedestrians. A large deep neural network may be configured and trained to achieve a high percentage of accuracy and low false negatives. One or both of the first stage neural network and the second stage neural network may be trained on existing datasets, such as the Caltech Pedestrian Dataset, internal datasets from fleet vehicles, and/or simulated data from related projects.

One example, of pedestrian network detection was presented in "Pedestrian Detection with a Large-Field-Of-View Deep Network", A. Angelova, A. Krizhevsky, V. Vanhoucke (IEEE International Conference on Robotics and Automation ICRA 2015). The large field of view networks developed by Angelova et al. presented pedestrian detection and rapid localization. However, Angelova et al. does not utilize saliency for localization, but instead requires the additional generation of a separate grid-based dataset of pedestrian location images, ignoring pedestrians that overlap grids and enforcing grid enclosure for detection. Thus, they have a pedestrian miss rate that is higher than needed to be viable for active safety applications. In contrast, selected embodiments of the present disclosure require no sliding window and thus eliminate one of the most computationally expensive aspects of state-of-art deep learning techniques.

Once one or more pedestrians 14 are detected, their states (e.g., position and velocity) may be tracked using a state-space-estimation technique (e.g., a particle filter). For example, in selected embodiments, a pedestrian component 20 may predict the path of one or more pedestrians 14 based on the tracked data, even after the pedestrians 14 have moved out of the field-of-view of the rear-facing camera 22. This may be accomplished by clustering and learning pedestrian behavior patterns. Alternatively, or in addition thereto, a pedestrian component 20 may employ one or more algorithms that determine object-behavior changes and real-time path planning in the presence of pedestrians 14 with uncertain intents.

A safety system 18 may continue to estimate the path of one or more pedestrians 14, and take or provide sufficient time to take appropriate action whenever an expected or predicted route 26 of a pedestrian 14 intersects with that 28 of the vehicle 12. Such action may include waiting until a pedestrian 14 has completely crossed an intersection 10, moving ahead after the pedestrian 14 has come to a full stop, or the like. In this manner, a vehicle 12 or a driver of a vehicle 12 may be warned regarding a pedestrian 14 before the pedestrian 14 comes into the view of a forward-facing camera or the driver. Thus, a safety system 18 in accordance with the present invention may use a rear-facing camera 22 mounted on a vehicle 12 to inform forward motion of that vehicle 12.

Figure 2:
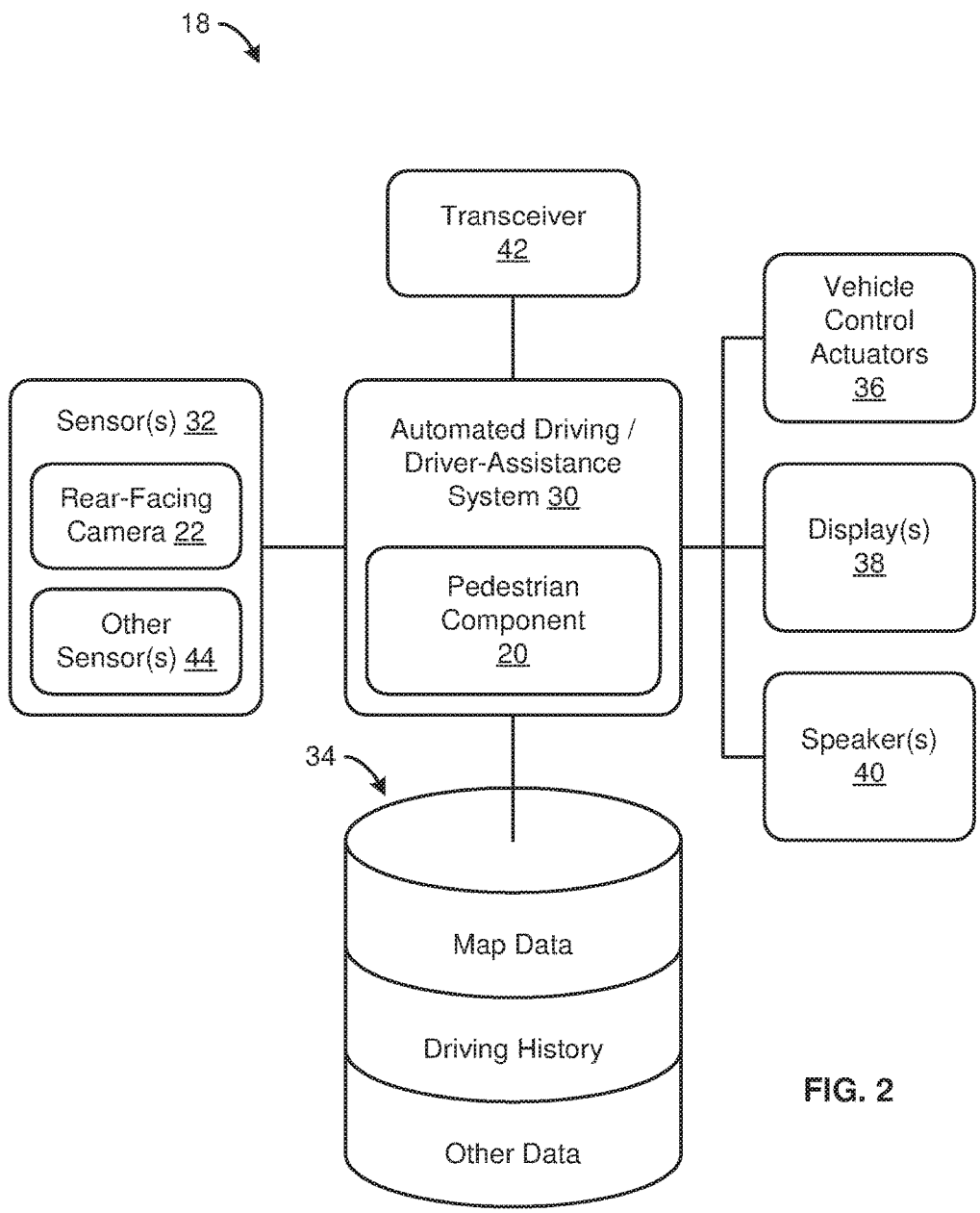
FIG. 2 is a schematic diagram of one embodiment of a safety system that includes an automated driving or driver-assistance system.

Referring to FIG. 2, in selected embodiments, a safety system 18 in accordance with the present invention may include an automated driving and/or driver-assistance system 30 (hereinafter a "driving system" 30), one or more sensors 32, one or more data stores 34, one or more vehicle-control actuators 36, one or more displays 38, one or more speakers 40, one or more wireless communication devices 42 (e.g., receivers, transmitters, or transceivers), or the like or a combination or sub-combination thereof.

A driving system 30 may automate, assist, or control operation of a vehicle 12 such as a car, truck, van, bus, large truck, emergency vehicle or any other automobile for transporting people or goods. For example, a driving system 30 may control one or more of braking, steering, acceleration, lights, alerts, driver notifications, radio, or any other auxiliary systems of a vehicle 12. Alternatively, a driving system 30 may not provide any direct control of the driving (e.g., steering, acceleration, or braking) of a vehicle 12, but may provide notifications and alerts to assist a human driver in driving safely. In selected embodiments, a driving system 30 may include or operate in cooperation with a pedestrian component 20.

A safety system 18 may include one or more sensors 32. Such sensors 32 may detect the presence of one or more objects near a vehicle 12. In selected embodiments, the sensors 32 of a safety system 18 may include a rear-facing camera 22. Additionally, a safety system 18 may include one or more other sensors 44 such as one or more radar devices, LIDAR systems, one or more other cameras, a global positioning system (GPS), one or more ultrasound devices, or the like or a combination or sub-combination thereof.

A data store 34 may store any data needed by a safety system 18 or any component thereof. In selected embodiments, a data store 34 may store relevant or useful data for navigation and safety such as map data, driving history, other data, or the like or a combination or sub-combination thereof.

In certain embodiments, a safety system 18 may include one or more wireless communication devices 42. Such devices 42 may enable a safety system 18 or vehicle 12 corresponding thereto to communicate with a mobile or wireless network, other vehicles 12, infrastructure, or any other communication system. For example, one or more wireless communication devices 42 may provide a mechanism for a safety system 18 to receive updated models or algorithms for use by a pedestrian component 20 in detecting, localizing, and/or predicting future motion of pedestrians 14.

A vehicle-control actuator 36 may implement one or more instructions of a driving system 30 in order to control some aspect of a corresponding vehicle 12. Suitable vehicle control actuators 36 may include electric motors, switches, or other actuators used to control braking, throttle, steering, or the like.

A safety system 18 may include one or more displays 38, speakers 40, or the like in order to facilitate communication with one or more human beings (e.g., a human driver or passenger located within a corresponding vehicle 12). A display 38 may be a heads-up display, a dashboard display or indicator, a display screen, or any other visual indicator that may be seen by a driver or passenger of a vehicle 12. A speaker 40 of a safety system 18 may form part of a sound system of a vehicle 12 or may be an independent speaker, dedicated to providing notifications to a driver or passenger of a vehicle 12.

It will be appreciated that the embodiment illustrated in FIG. 1 is given by way of example only. Other embodiments may include fewer or additional components without departing from the scope of the disclosure. Additionally, illustrated components may be combined or included within other components without limitation. For example, a pedestrian component 20 may be separate from a driving system 30 and a data store 34 may be included as part of a driving system 30 and/or as part of a pedestrian component 20.

Figure 3:
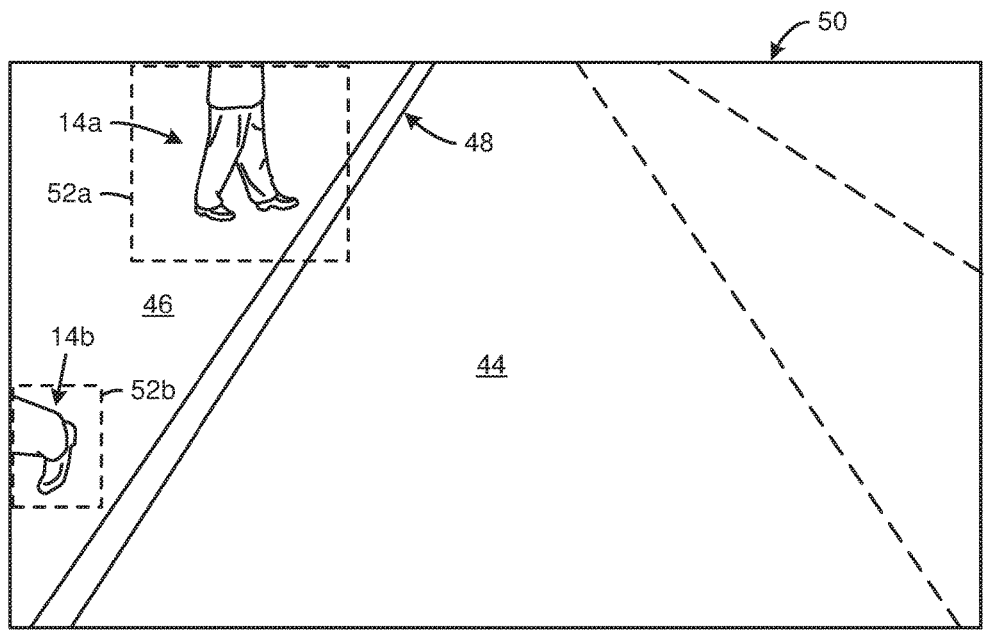
FIG. 3 is an illustration showing a schematic example of an image captured by a rear-facing camera of a vehicle.

Referring to FIG. 3, a pedestrian 14 may be a human that is not driving a vehicle 12. For example, a pedestrian 14 may include a person walking, running, sitting, or lying in an area near a vehicle 12. Pedestrians 14 may also include those using human powered devices such as bicycles, scooters, roller blades or roller skates, or the like. Pedestrians 14 may be located on or near roadways 44 such as in crosswalks 16, on sidewalks 46, on the shoulder 48 of the road 44, or the like. Pedestrians 14 may have significant variation in size, shape, or the like. For example, children, teenagers, seniors, or the like may all be detected or identified as pedestrians 14. Similarly, pedestrians 14 may vary significantly in a type or amount of clothing. Thus, the appearance of pedestrians 14 to a rear-facing camera 22 or other sensor may be quite varied.

FIG. 3 provides a schematic illustration of an image 50. The image 50 is one example of what may be captured by a rear-facing camera 22 mounted on a vehicle 12 (e.g., a vehicle 12 stopped at an intersection 10). As shown, an image 50 may include one or more pedestrians 14a, 14b on or near a roadway 44. Accordingly, a pedestrian component 20 may generate one or more bounding boxes 52a, 52b or define one or more sub-regions 52a, 52b of the image 50 where pedestrians 14 may be located.

For example, a pedestrian component 20 may generate information that defines a location within an image 50 for each of the sub-regions 52a, 52b in which pedestrians 14 may be located and that merits further analysis or processing. In selected embodiments, a pedestrian component 20 may process an image 50 using a neural network that has been trained to produce a saliency map that indicates regions 52a, 52b where pedestrians may be located.

Using a saliency map, or any other indication of regions 52a, 52b of an image 50 where pedestrians 14 may be located, a pedestrian component 20 may process those sub-regions 52a, 52b to classify the regions as including or not including a pedestrian 14. In selected embodiments, a pedestrian component 20 may detect and localize one or more pedestrians 14 within the image 50. For example, a pedestrian component 20 may determine that a first sub-region 52a include a first pedestrian 14a and that a second sub-region 52b includes a second pedestrian 14b.

In certain embodiments, an image 50 captured by a rear-facing camera 22 may not include all of one or more pedestrians 14. For example, to accomplish their intended purpose, backup cameras often are oriented with a downward component. This allows them to "see" the ground close behind the corresponding vehicle 12. Accordingly, when a rear-facing camera 22 is a backup camera, the images 50 produced thereby may have a somewhat downward point of view. This point of view may result in only part of one or more pedestrians 14 being captured in an image 50. For example, the upper portions of one or more pedestrians 14 may be effectively cropped out due the point of view of the rear-facing camera 22. As a result, a pedestrian component 20 may be trained to detect and localize pedestrians 14, even when less than all of the body of the pedestrian 14 is present or captured in the image 50.

Similarly, in selected embodiments, an image 50 captured by a rear-facing camera 22 may distort the shape of one or more pedestrians 14. For example, to accomplish their intended purpose, backup cameras often have a very wide field of view. This allows them to have good peripheral vision, but it introduces distortions into the resulting images. Accordingly, when a rear-facing camera 22 is a backup camera, the objects (e.g., pedestrians 14) captured in the resulting images 50 may be distorted in shape. Thus, in selected embodiments, a pedestrian component 20 may be trained to detect and localize pedestrians 14, even when the shapes of the pedestrians 14 are distorted in the image 50.

Figure 4:
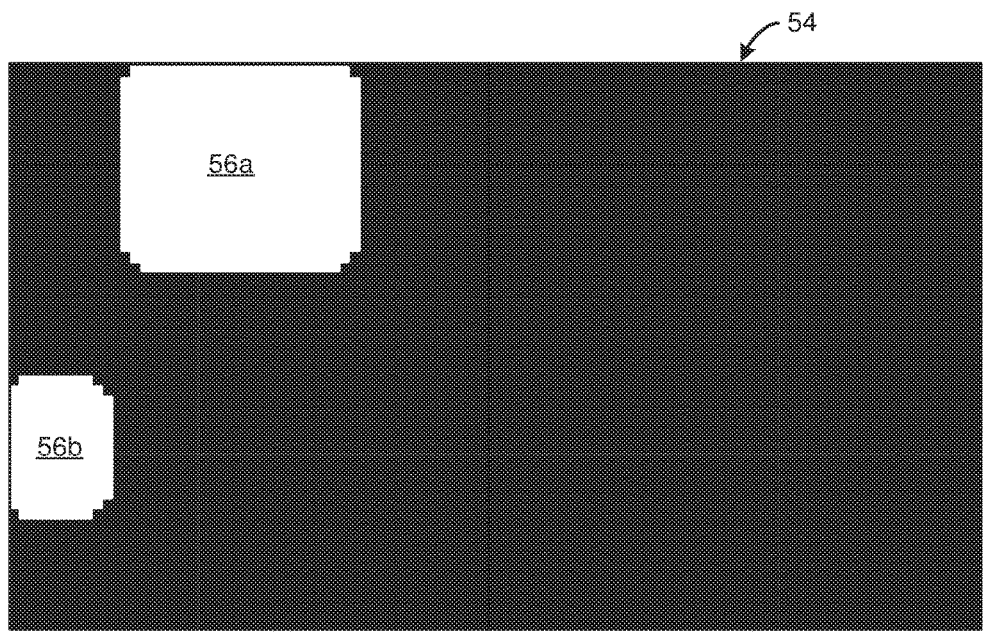
FIG. 4 is an illustration showing a schematic example of a saliency map for the image of FIG. 3, according to one implementation.

Referring to FIG. 4, a schematic view is provided of one embodiment of a saliency map 54 that may be produced by a pedestrian component 20. A saliency map 54 may operate as a label for a corresponding image 50. For example, the saliency map 54 of FIG. 4 provides a label for the image 50 of FIG. 3.

In selected embodiments, a pedestrian component 20 may process portions of an image 50 corresponding to the locations 56a, 56b delineated by a saliency map 54 in an effort to detect and/or localize one or more pedestrians 14. In the illustration, a first location 56a and a second location 56b may correspond to the first sub-region 52a and the second sub-region 52b, respectively.

In certain embodiments, a pedestrian component 20 may generate a modified image by overlaying or combining a saliency map 54 with a corresponding image 50 and process the modified image to detect pedestrians 14. For example, a modified image may be black (or some other color) except for in the locations 56a, 56b where the corresponding portions of the image 50 may remain at least partially visible or completely unchanged. A saliency map 54 may be scaled up and/or an image 50 may be scaled down in order to have a matching resolution so that pedestrian detection may be performed.

In selected embodiments, a saliency map 54 may have a lower resolution than a corresponding image 50. For example, a saliency map 54 may have a standard size or may have a resolution reduced by a predefined factor. Low resolution saliency maps 54 may still be very effective and reduce processing workload or processing delay. In such embodiments, a pedestrian component 20 may process an image 50 based on a corresponding saliency map 54 by scaling up the saliency map 54. For example, a pedestrian component 20 may process multiple pixels of a corresponding image 50 in relation to the same pixels in the saliency map 54. Although the saliency map 54 of FIG. 4 is illustrated with black or white pixels, some embodiments may generate and use saliency maps 54 having grayscale values.

Figure 5:
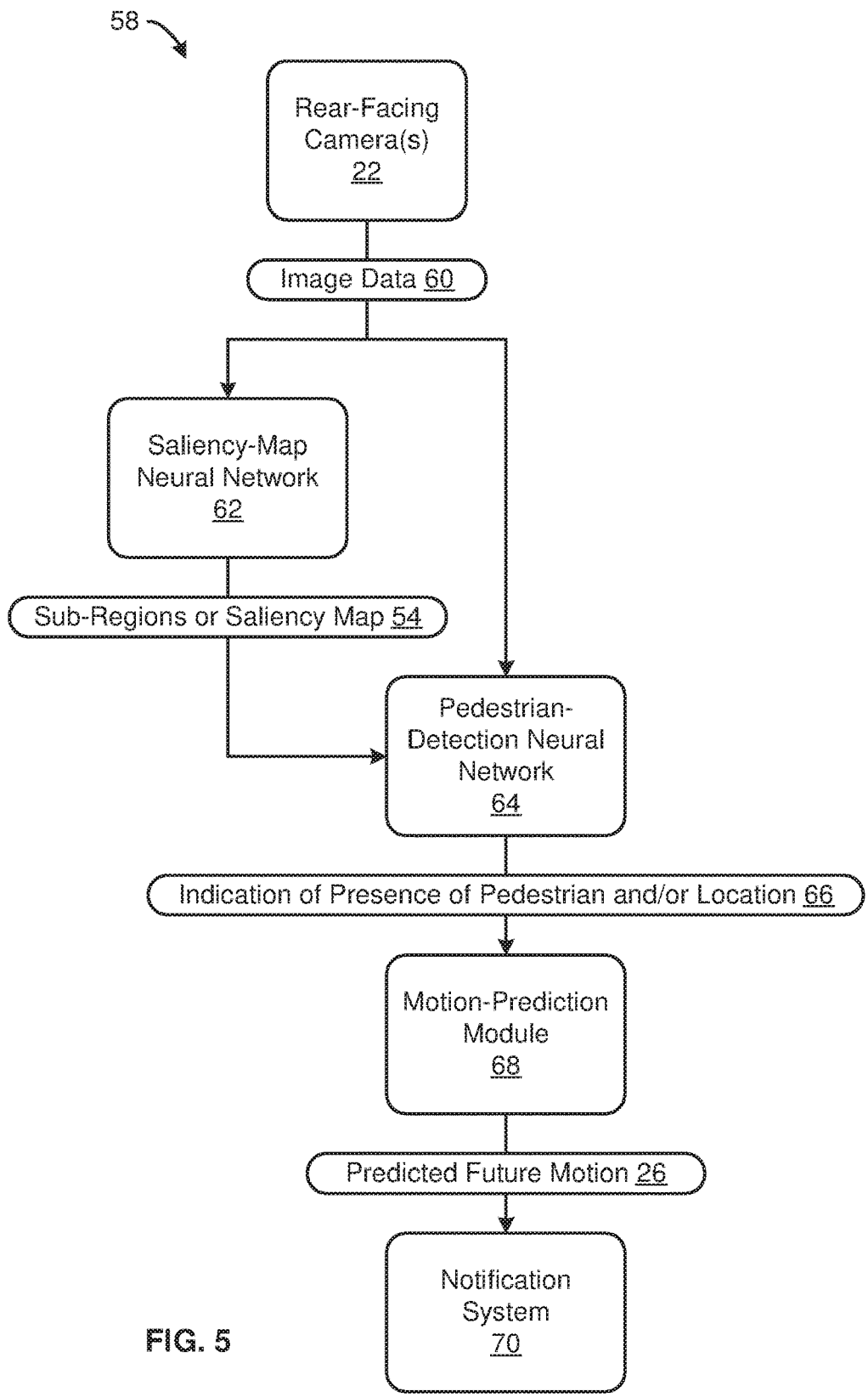
FIG. 5 is a schematic block diagram illustrating pedestrian detection, according to one implementation.

Referring to FIG. 5, in certain embodiments, a flow 58 within a safety system 18 in accordance with the present invention may begin when a rear-facing camera 22 outputs image data 60 (e.g., data 60 comprising or defining one or more images 50). Image data 60 may be fed into a saliency-map neural network 62. A saliency-map neural network 62 may process the image data 60 to produce a saliency map 54 and/or an indication of one or more sub-regions 52a, 52b of the image data 60 that likely contain a pedestrian 14.

A saliency map 54 or other indication of one or more sub-regions 52a, 52b of the image data 60 that likely contain a pedestrian 14, along with the image data 60, may be fed into a pedestrian-detection neural network 64 for classification and/or localization. For example, a pedestrian-detection neural network 64 may classify the image data 60 for each sub-region 52a, 52b identified by the saliency-map neural network 62 as containing or not containing a pedestrian 14. Additionally, a pedestrian-detection neural network 64 may determine a specific location or region within the image data 60 (e.g., may identify a plurality of pixels within an image 50) where the pedestrian 14 is located.

A pedestrian-detection neural network 64 may output an indication 66 of the presence and/or location of one or more pedestrians 14 to a motion-prediction module 68. A motion-prediction module 68 may use one image 50 or image data 60 from multiple images 50 collected over a period of time (e.g., a relatively short period of time comprising a couple seconds or less) to determine one or more of a location of a pedestrian 14 with respect to the corresponding vehicle 12, a speed of travel of the pedestrian 14, and a direction of travel of the pedestrian 14. Accordingly, a motion-prediction module 68 may predict future motion 26 of one or more pedestrians 14.

For example, based on an estimated location with respect to a vehicle 12, an estimated current speed, and an estimated current direction, a motion-prediction module 68 may predict when a pedestrian 14 that is currently within the field of view of a rear-facing camera 22 (e.g., currently behind a vehicle) would arrive at a location that is within the path of the vehicle 12. Thus, a motion-prediction module 68 may provide some idea of where a pedestrian 14 may be at selected moments in time even when the pedestrian 14 in not within view of any sensors of the corresponding vehicle 12 or driver of the corresponding vehicle 12.

In selected embodiments, a motion-prediction module 68 may be or comprise a motion-prediction neural network. For example, a motion-prediction module 68 may comprise a motion-prediction neural network that is configured for clustering and learning pedestrian behavior patterns. Alternatively, or in addition thereto, a motion-prediction neural network may implement algorithms that determine object-behavior changes and real-time path planning in the presence of pedestrians 14 with uncertain intents. Accordingly, a motion-prediction neural network may find patterns in images data 60 that correspond to pedestrians 14 doing certain things such as slowing to a stop, hurrying into a crosswalk 16, turning right, turning left, or the like. Thus, a motion-prediction module 68 may predict future motion 26 with using more than currently location, speed, and direction.

A motion-prediction module 68 may output predicted future motion 26 corresponding to one or more pedestrians 14 captured in the image data 60. In selected embodiments, predicted future motion 26 may be output to a notification system 70. Accordingly, the presence, location, and/or predicted future motion 26 of one or more pedestrians 14 may be used by a notification system 70 to warn a human driver or notify a driving system of a vehicle 14 whenever forward motion 28 of a vehicle 12 is likely to conflict or be on a collision course with a pedestrian 14 traveling in the predicted manner 26.

Figure 6:
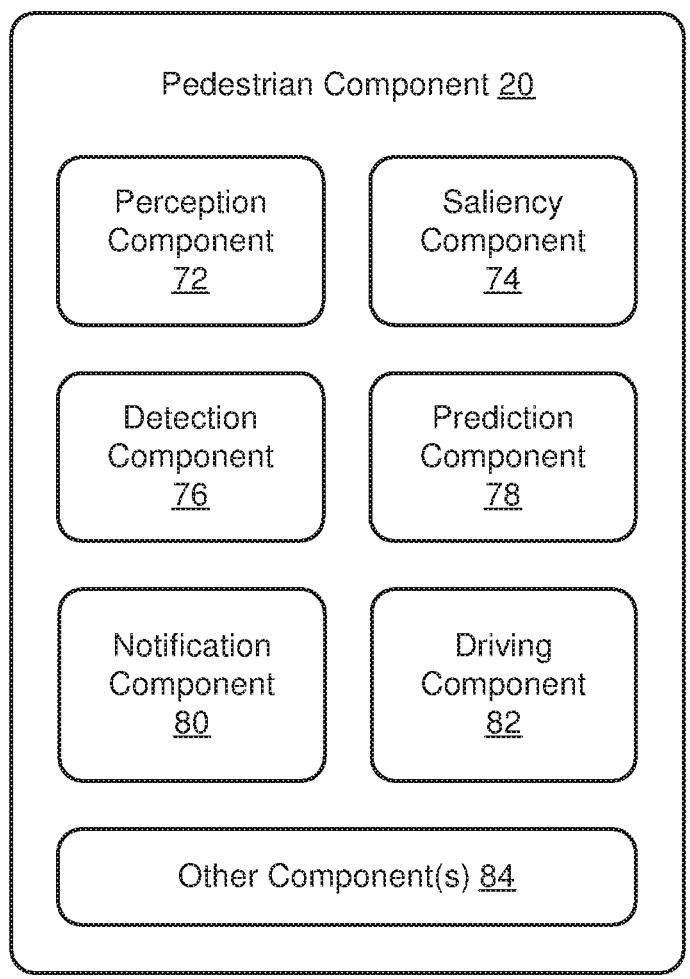
FIG. 6 is a schematic block diagram illustrating example components of a pedestrian component, according to one implementation.

Referring to FIG. 6, in selected embodiments, a pedestrian component 20 may include a perception component 72, saliency component 74, detection component 76, prediction component 78, notification component 80, driving component 82, one or more other components 84, or the like or a combination or sub-combination thereof. Accordingly, the illustrated components 72, 74 76, 78, 80, 82, 84 are given by way of illustration only and may not all be included in all embodiments. In fact, some embodiments may include only one or any combination of two or more of the illustrated components 72, 74 76, 78, 80, 82, 84. In selected embodiments, some of the illustrated components 72, 74 76, 78, 80, 82, 84 may be located outside a pedestrian component 20, such as within the driving system 30 or elsewhere within a safety system 18 without departing from the scope of the disclosure.

A perception component 72 may be configured to receive image data 60 from a rear-facing camera 22. A saliency component 74 may be configured to process image data 60 received from a rear-facing camera 22 to identify locations 52a, 52b where pedestrians 14 may be located. In selected embodiments, a saliency component 74 may generate a saliency map 54 for one or more images 50.

A saliency component 74 may process image data 60 using a neural network. For example, each pixel value of an image 50 may be fed into a neural network (e.g., a saliency-map neural network 62) that has been trained to identify regions 52a, 52b within the image 50 that are likely, or most likely, when compared to other regions of the image 50, to include pedestrians 14. In certain embodiments, such a neural network may include a deep convolutional network that has been trained for quickly identifying sub-regions 52a, 52b that are likely to include pedestrians 14.

The sub-regions 52a, 52b identified by such a neural network may be regions that likely include pedestrians 14 with a low level of false negatives, but with potentially a higher level of false positives. For example, the identification of sub-regions 52a, 52b may be over inclusive in that some regions may not actually include a pedestrian while the identification of sub-regions also has a low probability of missing a region where a pedestrian 14 is located.

In certain embodiments, the output of a neural network corresponding to a saliency component 74 may be an x-y coordinate of an image 50 and one or more distance parameters defining a distance from the x-y coordinate that are included within a sub-region 52a, 52b. For example, the distance parameters may define the edges of a rectangular or elliptical sub-region 52a, 52b of an image 50. In other embodiments, the output of a neural network corresponding to a saliency component 74 may be a saliency map 54.

In selected embodiments, a neural network (e.g., a saliency-map neural network 62) may be configured to operate at a lower resolution than an image 50 or other information gathered by a rear-facing camera 22. For example, a neural network may process a low resolution version of an image 50 to produce the saliency map 54. Alternatively, a neural network may process a full resolution image 50 and produce a low resolution saliency map 54. In still other embodiments, both an input resolution for a neural network and an output resolution for a saliency map 54 may be lower than a full resolution of an image 50. In such embodiments, low resolution saliency maps 54 may provide performance as good as or nearly as good as full resolution saliency maps 54, while requiring fewer computing resources and/or resulting in quicker processing times.

In selected embodiments, a neural network (e.g., a saliency-map neural network 62) may be trained with images 50 and ground truth identifying regions where pedestrians 14 are or are not present. Thus, the output of a neural network and/or a saliency component 74 may be a pedestrian-location saliency map 54. This is different than some saliency maps that attempt to predict or indicate locations where a human eye is naturally directed when looking at an image because it is specific to pedestrian locations. Identification of locations where pedestrians 14 are likely located may significantly reduce processing power required to detect pedestrians 14 because much less than a full image may need to be processed for object detection or a smaller neural network may be used.

In certain embodiments, a saliency component 74 may prioritize one or more locations identified as likely having pedestrians 14. For example, the locations may be prioritized in order of likelihood that a pedestrian 14 is present. These locations may then be processed in order of priority to facilitate speed in identifying pedestrians 14. For example, a first region 52a may be most likely and a second region 52b may be less likely to include a pedestrian 14, based on processing using a neural network (e.g., a saliency-map neural network 62). By searching the first region 52a first, the chances that a pedestrian 14 will be located sooner may be significantly increased. Similarly, the one or more locations may be prioritized based on position in relation to a path to be traveled by a vehicle 12. For example, locations closer to a vehicle 12 may be prioritized over locations that are farther behind the vehicle 12 or farther away from a path of the vehicle 12.

A detection component 76 may be configured to detect a presence of a pedestrian 14 within an image 50. For example, the detection component 76 may process image data 60 to detect a human pedestrian 14 using object recognition or any image processing techniques. In selected embodiments, a detection component 76 may localize a pedestrian 76 within the image data 60. For example, a detection component 76 may identify one or more pixels that correspond to a pedestrian 14. In certain embodiments, a detection component 76 may localize a pedestrian 14 with respect to a vehicle 12 (e.g., with respect to a rear-facing camera 22 mounted on a vehicle 12). That is, a detection component 76 may determine a distance between a rear-facing camera 22 and the pedestrian 14 and/or a direction relative to a forward or driving direction of the vehicle 12 and the pedestrian 14.

In selected embodiments, a detection component 76 may detect pedestrians 14 by processing sub-regions 52a, 52b identified by the saliency component 74. That is, rather than processing an image 50 as a whole, a detection component 76 may only process regions 52a, 52b of the image 50 identified by the saliency component 74 as likely, or more likely, containing a pedestrian 14. Thus, a detection component 76 may process each sub-region 52a, 52b separately to confirm or determine that a pedestrian 14 is or is not present within the specific region 52a, 52b.

In certain embodiments, a modified image generated by combining an image 50 and a saliency map 54 (e.g., using a threshold or other effect) defined by a saliency component 74 may be processed by a detection component 76 to locate pedestrians 14. A saliency map 54 may "black out," "blur," or otherwise hide portions of the image 50 that are not likely to include pedestrians 14 while allowing the other portions to be processed by the detection component 76.

In selected embodiments, a detection component 76 may be configured to process an image 50, or one or more sub-portions 52a, 52b of an image 50, using a neural network (e.g., a pedestrian-detection neural network 64). A neural network used to detect pedestrians 14 may be a different neural network than the neural network used by the saliency component 74.

In certain embodiments, a neural network (e.g., a pedestrian-detection neural network 64) may include a deep convolutional neural network that has been trained to detect pedestrians 14 with high accuracy and a low false negative rate. In selected embodiments, a detection component 76 may use a saliency map 54 or other indication of sub-regions 52a, 52b generated by a saliency component 74 to process an image 50 or portions thereof at full resolution. For example, a detection component 76 may use a low resolution saliency map 54 to identify regions 52a, 52b of an image 50 that need to be processed, but then process those regions 52a, 52b at an elevated or original resolution.

In certain embodiments, a detection component 76 may use a neural network (e.g., a pedestrian-detection neural network 64) that has been trained using cropped ground truth bounding boxes to determine whether a pedestrian 14 is or is not present. Such a neural network may be a classifier that classifies an image 50, or a portion of an image 50, as containing a pedestrian 14 or not containing a pedestrian 14. For example, a detection component 76 may classify each portion identified by a saliency component 74 as including or not including a pedestrian 14.

In selected embodiments, a detection component 76 may process regions 52a, 52b identified by the saliency component 74 in order of priority. For example, locations 52a, 52b with higher priority may be processed first to determine whether a pedestrian 14 is present. Processing in order of priority may allow for increased speed in detecting pedestrians 14 and for quicker response times to prevent accidents, collision, or path planning.

A prediction component 78 may use image data 60 (e.g., one or more images 50) to determine one or more of a location of a pedestrian 14 with respect to a corresponding vehicle 12, a speed of travel of the pedestrian 14, or a direction of travel of the pedestrian 14 and/or to infer intent to behave (e.g., move or not move) in a particular way. Accordingly, a prediction component 78 may be or comprise a motion-prediction module 68.

In selected embodiments, a prediction component 78 may predict the future motion 26 of one or more pedestrians 14 in order of priority. For example, pedestrians 14 corresponding to (e.g., identified within) locations 52a, 52b with higher priority may be processed first. Processing in order of priority may allow for increased speed in prediction the future motion 26 of pedestrians 14 and for quicker response times to prevent accidents, collision, or path planning.

A notification component 80 may configured to provide one or more notifications to a driver or automated driving system of a vehicle 12. Accordingly, a notification component 80 may be or comprise a notification system 70. In selected embodiments, a notification component 80 may provide notifications to a driver using a display 38 or speaker 40. For example, a location of a pedestrian 14 may be indicated on a heads-up display. In certain embodiments, a notification from a notification component 80 may include an instruction to perform a maneuver or may simply warn that a pedestrian 14 is present even when the pedestrian 14 is currently in a blind spot of the corresponding vehicle 12 or the driver of the corresponding vehicle 12.

In selected embodiments, a notification component 80 may notify a driver or driving system 30 of a driving maneuver selected or suggested by a driving component 82. In other embodiments, a notification component 80 may notify a driver or driving system 30 of a current location and/or predicted future motion 26 of a pedestrian 14 so that collision avoidance may be performed.

A driving component 82 may be configured to select a driving maneuver for a corresponding vehicle 12 based on the presence or absence of a pedestrian 14 and the predicted future motion 26 corresponding thereto. For example, based on a predicted future motion 26 for a particular pedestrian 14, a driving component 82 may determine that a corresponding vehicle 12 (e.g., an autonomous vehicle 12) should wait to perform a right-hand turn, proceed through an intersection 10, or the like due to a predicted collision with that pedestrian 12.

Figure 7:
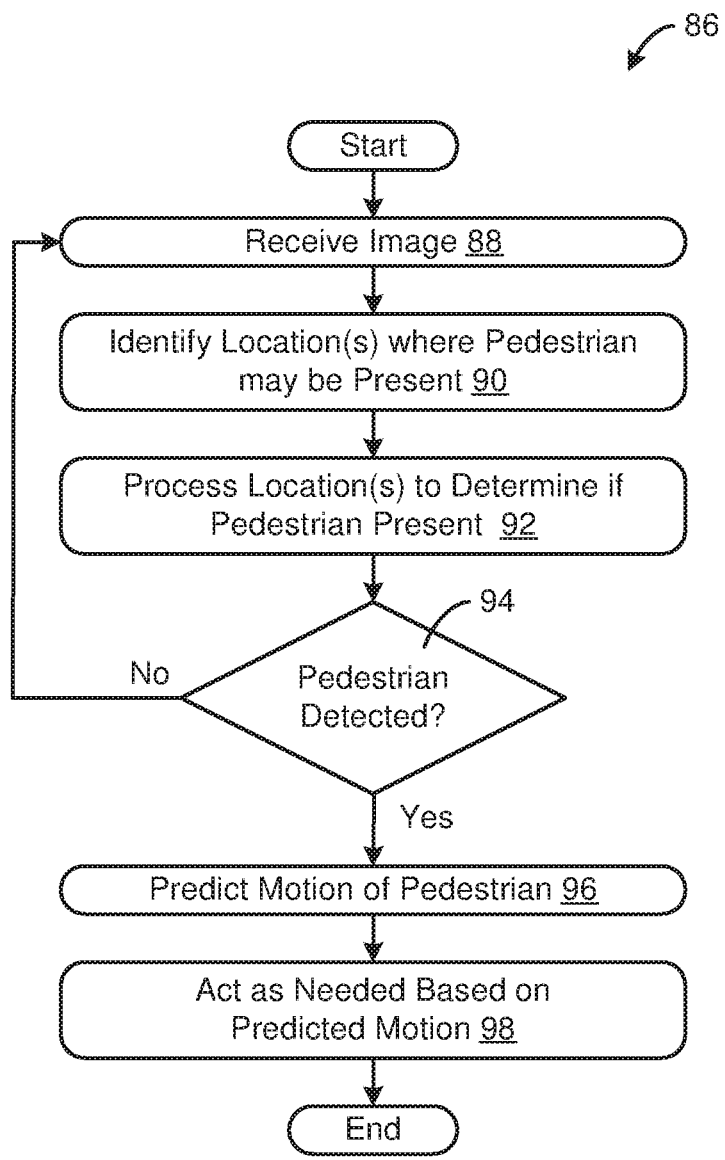
FIG. 7 is a schematic block diagram illustrating a method for pedestrian detection, according to one implementation.

Referring to FIG. 7, a safety system 18 may support, enable, or execute a process 86 in accordance with the present invention. In selected embodiments, such a process 86 may begin when a perception component 72 receives 88 an image 50 of a region behind a vehicle 12. A saliency component 74 may process the image 50 using a first neural network to identify 90 one or more regions 52a, 52b where pedestrians 14 are likely located within the image 50. A detection component 76 may then process 92 the one or more regions 52a, 52b of the image 50 using a second neural network to determine whether a pedestrian 14 is present in any such regions 52a, 52b.

If no pedestrian 14 is detected 94, then a perception component 72 may receive 88 another image 50 and the identifying 90 and processing 92 may be repeated for that image 50. However, if one or more pedestrians 14 are detected 94, then a prediction component 78 may predict 96 the future motion 26 of the one or more pedestrians 14. A notification component 80 and/or driving component 82 may act 98 as needed based on the predicted motion 26. For example, a notification component 80 and/or driving component 82 may provide or initiate a warning or control operation of a vehicle 12 as desired or necessary whenever a forward motion 28 of a vehicle 12 is likely to conflict or be on a collision course with a pedestrian 14 traveling in the predicted manner 26.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "selected embodiments," "certain embodiments," or any other "embodiment," "embodiments," or "implementation" indicate that the embodiment described may include a particular feature, structure, or characteristic, but every embodiment need not include that particular feature, structure, or characteristic. Moreover, such phrases are not necessarily referring to the same embodiment. Further, when a particular feature, structure, or characteristic is described in connection with selected or certain embodiments, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network comprising one or more data links that enable the transport of electronic data between computer systems and/or modules and/or other electronic devices. When information is transferred or provided over a computer network or another communications connection (either hardwired, wireless, or a combination of hardwired or wireless) to a computer, the computer properly views the connection as a transmission medium. Transmissions media can include a computer network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising: receiving one or more images from a rear-facing camera on a vehicle facing in a rearward direction; determining, by a computer system, that a pedestrian is present in the one or more images; predicting, by the computer system based on the one or more images, future motion of the pedestrian; evaluating the future motion of the pedestrian with respect to a path of the vehicle in a forward direction opposite the rearward direction; determining (a) that the future motion of the pedestrian is in conflict with the path of the vehicle in the forward direction; and in response to (a), notifying, by the computer system, a driver-assistance or automated driving system that a conflict exists between forward motion of the vehicle and the future motion.

2. The method of claim 1, wherein the determining comprises: processing, by the computer system, the one or more images using a first neural network to determine one or more locations where pedestrians are likely located within the one or more images; and processing, by the computer system, the one or more locations of the one or more images using a second neural network to determine that the pedestrian is present.

3. The method of claim 2, wherein the predicting comprises determining, based on the one or more images, a velocity and direction of the pedestrian.

4. The method of claim 3, wherein the predicting further comprises determining, based on the one or more images, a location of the pedestrian in relation to the vehicle.

5. The method of claim 4, wherein the future motion comprises motion outside of the view of the rear-facing camera.

6. The method of claim 5, wherein the first neural network comprises a network trained to identify approximate locations within the one or more images that likely contain pedestrians.

7. The method of claim 6, wherein the first neural network generates a saliency map indicating most likely locations of pedestrians.

8. The method of claim 7, wherein the saliency map comprises a lower resolution than the one or more images.

9. The method of claim 8, wherein the second neural network processes the one or more locations within the one or more images at full resolution.

10. The method of claim 1, wherein: the rear-facing camera is a back-up camera; and the one or more images are captured by the back-up camera while the vehicle is in a forward gear.

11. A method for detecting pedestrians comprising: receiving one or more images from a rear-facing camera on a vehicle, the one or more images being captured while the vehicle is in a forward gear; identifying, by a first neural network of a computer system, the one or more images to determine one or more regions where pedestrians are likely located within the one or more images; determining, by a second neural network of the computer system, that a pedestrian is present in at least one of the one or more regions; predicting, by the computer system based on the one or more images, future motion of the pedestrian, the predicted future motion comprising motion outside of the view of the rear-facing camera; evaluating, by the computer system, the future motion of the pedestrian with respect to a path of the vehicle in a forward direction; determining, by the computer system, (a) that the future motion of the pedestrian is in conflict with the path of the vehicle in the forward direction; and in response to (a), notifying, by the computer system, a driver-assistance or automated driving system that a conflict exists between forward motion of the vehicle and the predicted future motion.

12. The method of claim 11, wherein the predicting comprises determining, based on the one or more images, a velocity and direction of the pedestrian.

13. The method of claim 12, wherein the predicting further comprises determining, based on the one or more images, a location of the pedestrian in relation to the vehicle.

14. The method of claim 13, wherein: the first neural network generates one or more saliency maps indicating the one or more regions; the one or more saliency maps each comprise a lower resolution than the one or more images; and the second neural network processes the one or more regions within the one or more images at full resolution.

15. A system comprising: a rear-facing camera positioned on a vehicle to capture one or more images of a region behind the vehicle; a saliency component configured to process the one or more images using a first neural network to generate one or more low resolution saliency maps indicating one or more regions where pedestrians are most likely located within the one or more images; a detection component configured to process the one or more regions using a second neural network to determine, for each of one or more regions, whether a pedestrian is present; a prediction component configured to process the one or more images to predict future motion of one or more pedestrians captured in the one or more images; and a notification component configured to- evaluate the future motion of the pedestrian with respect to a path of the vehicle in a forward direction; when (a) the future motion of the pedestrian is in conflict with the path of the vehicle in the forward direction, provide a notification indicating a conflict between forward motion of the vehicle of the predicted future motion of the one or more pedestrians.

16. The system of claim 15, wherein the prediction component is configured to: determine, based on the one or more images, a velocity and direction for each of the one or more pedestrians; determine, based on the one or more images, a location for each of the one or more pedestrians in relation to the vehicle; and predict the future motion of one or more pedestrians based at least in part on the velocity, direction, and location for each of the one or more pedestrians.

17. The system of claim 16, wherein the one or more saliency maps comprise lower resolutions than the one or more images.

18. The system of claim 17, wherein the detection component uses the second neural network to process at full resolution the one or more regions within the one or more images.

19. The system of claim 18, wherein the second neural network comprises a deep neural network classifier that has been trained using cropped ground truth bounding boxes to determine that a pedestrian is or is not present.

20. The system of claim 15, wherein: the rear-facing camera is a back-up camera; and the one or more images are captured by the back-up camera while the vehicle is in a forward gear.

* * * * *